United States Patent
Lewis, Jr. et al.

[11] 3,922,157
[45] Nov. 25, 1975

[54] PRODUCTION OF NITROGEN-PHOSPHORUS COMPOUNDS

[75] Inventors: Harry T. Lewis, Jr.; John G. Getsinger, both of Florence, Ala.

[73] Assignee: Tennessee Valley Authority, Muscle Shoals, Ala.

[22] Filed: Oct. 9, 1973

[21] Appl. No.: 404,233

Related U.S. Application Data

[63] Continuation of Ser. No. 341,908, March 16, 1973.

[52] U.S. Cl. .................................. 71/34; 71/49
[51] Int. Cl.² ................................. C05B 7/00
[58] Field of Search .......... 71/34, 32, 49; 423/305, 423/307, 315, 314

[56] References Cited
UNITED STATES PATENTS

| | | | |
|---|---|---|---|
| 2,713,536 | 7/1955 | Driskell | 71/32 X |
| 2,839,375 | 6/1958 | Christian | 71/32 |
| 2,839,376 | 6/1958 | Christian | 71/32 |
| 2,884,318 | 4/1959 | Christian | 71/35 |
| 3,539,328 | 11/1970 | Lewis | 71/34 |

*Primary Examiner*—John Adee
*Attorney, Agent, or Firm*—Robert A. Petrusek

[57] ABSTRACT

A vapor phase reaction process for production of concentrated nitrogen-phosphorus compositions. The process involves simultaneous reaction of elemental phosphorus with a low proportion of input ammonia and an excess of oxygen (air) in a single-stage reactor. Reactor is maintained at about 500° to 1300°F. Retention time of gases in reactor ranges from about 0.5 to 3.5 seconds at operating conditions. Product of the reaction gases is collected as dry, white, amorphous solid. Products contain 14 to 16 percent N, 31 to 33 percent P, and up to 91 percent total plant nutrient content (N + $P_2O_5$ equivalent). Water solubility of the solid products is in the range from about 90 to 100 percent. Greenhouse tests indicate that the products are fully effective as fertilizer.

9 Claims, 3 Drawing Figures

FLOW SHEET FOR REACTING AMMONIA, PHOSPHORUS AND OXYGEN (AIR)

Fig. 1

FLOW SHEET FOR REACTING AMMONIA, PHOSPHORUS AND OXYGEN (AIR)

Fig. 2

APPARATUS FOR SINGLE-STAGE REACTION OF PHOSPHORUS, AMMONIA, AND OXYGEN

Fig. 3

EFFECT OF REACTOR SURFACE AREA:
VOLUME RATIO ON RECOVERY OF
NONGLASS PRODUCT FROM $NH_3 - P_4 - O_2$
REACTION

PRODUCTION OF NITROGEN-PHOSPHORUS COMPOUNDS

The invention herein described may be manufactured and used by or for the Government for governmental purposes without the payment to us of any royalty therefor.

This application is a continuation of our copending application Ser. No. 341,908, filed Mar. 16, 1973, for PRODUCTION OF NITROGEN-PHOSPHORUS COMPOUNDS.

Our invention relates to an improvement in method for production of nitrogen-phosphorus compositions; more particularly it relates to the production of a new composition of matter by simultaneously reacting vapors of ammonia, phosphorus, and oxygen (air) in a single-stage reactor to yield dry, free flowing solid products of extremely high water solubility, about 90 percent at 77°F and even up to 100 percent water solubility at 77°F of the nitrogen and $P_2O_5$ contents of the material. The solid products are highly concentrated in phosphorus (up to 33.2 percent) and in total plant nutrient (N + $P_2O_5$ equivalent) up to 91 percent or up to 15–76–0 (N—$P_2O_5$—$K_2O$) grade. These products are finished fertilizer materials, not intermediate products requiring hydrolysis to yield materials suitable as fertilizers.

Heretofore the action of ammonia on phosphorus pentoxide has been studied by a number of investigators beginning, we believe, with the work of Schiff (*Liebig's Ann.* 103, 168–1857). Sanfourche et al. (*Bull Soc. Chim.* 47, No. 4, 273–9 — 1930), in a paper describing their own studies, reviewed the work of previous investigators. In the small-scale work by Sanfourche et al., red phosphorus was burned with a mixture of air and nitrogen, ammonia was added to the combustion products, and the reaction product was collected in jars. These workers investigated the effect of the amount of moisture in the combustion air and found that they obtained low yields of product when they used artificially dried air. They postulated their reaction to be $P_2O_5 + 3NH_3 + H_2O = P_2O_3NH_2(ONH_4)_2OH$ (Diammonium amidopyrophosphate)

Methods for preparing ammonium metaphosphate from phosphorus, air, water, and ammonia also have been proposed. Among the methods proposed are those described by Ross et al. (U.S. Pat. No. 1,194,077) and by Rice (U.S. Pat. Nos. 2,561,415 and 2,689,780), and by Arvan (U.S. Pat. No. 2,958,577). In Rice U.S. Pat. No. 2,561,415, for example, the reaction temperature is between 600° and 900°F and his product contains 32 percent P, whereas in Arvan U.S. Pat. No. 2,958,577 the reaction temperature is in the range from 390° to 1110°F and Arvan's products, one of which is reported to be a metaphosphate, contains above about 30 percent P.

According to these methods, phosphorus is burned with air containing moisture, and the resulting phosphorus pentoxide is reacted with ammonia. The product of this reaction is collected as a white, fluffy powder. The following reaction is presumed to take place:

$P_2O_5 + H_2O + 2NH_3 \rightarrow 2NH_4PO_3$

If the air used to burn the phosphorus contains insufficient water to satisfy the requirement for the reaction, additional water is added to the system.

Woodstock, in U.S. Pat. No. 2,122,122, describes a process in which ammonia is reacted with solid phosphorus pentoxide.

Somewhat more recently, reactions involving ammonia, phosphorus, and oxygen, namely $NH_3$—$P_2O_5$ reactions, have been studied by a number of investigators. Driskell (U.S. Pat. No. 2,713,536) burned phosphorus in dry air and ammoniated the hot combustion gases at about 600°F. A typical product contained 33.9 percent P, had limited solubility in water, and was highly hygroscopic. Hignett et al (U.S. Pat. No. 2,856,279) first produced a product similar to Driskell's and then hydrolyzed and agglomerated the material in a rotary tumbler at about 250°F with steam to reduce its hygroscopicity and increase its bulk density. Jones (U.S. Pat. No. 3,131,992) obtained materials of low water solubility (10–30 percent by weight) by burning phosphorus with dry air, cooling the combustion products (preferably in the range from 450° to about 950°F), and then adding anhydrous ammonia. In still another patent (Hibbetts et al., U.S. Pat. No. 3,226,222) phosphorus pentoxide is suspended in a liquid hydrocarbon such as N-heptane, ammonia added in a pressure vessel at 50 psi and the temperature maintained in the range from about 120° to about 300°F, with the reaction product separated by filtration. By this latter method, hygroscopic products of about 27–67–0 grade (29.3 percent P) were obtained.

Christian (U.S. Pat. No. 2,839,376) and Lewis, Jr. (U.S. Pat. No. 3,539,328), unlike the prior art referred to supra, eliminated the phosphorus oxidation step prior to ammoniating the combustion gases. The works of these inventors involved a simultaneous reaction of vapor phase mixtures of ammonia and oxygen with phosphorus. The reaction was carried out in a two-stage reactor.

In Christian's process, phosphorus vapors are reacted with oxygen, ammonia, and nitrogen at temperatures below about 300°F, followed by passage of the reaction gases through a second reaction zone maintained above 570°F and below 1110°F and preferably in the range from about 800° to about 1100°F. In this process of Christian, the product collected in the elastrostatic precipitator is described as a white, dry powder essentially nonhygroscopic and with limited solubility in water. A typical ultimate analysis thereof is a grade 21–73–0 (31.9 percent P).

In essence, the novelty of the invention of Lewis U.S. Pat. No. 3,539,328 consists of (1) a simultaneous reaction of ammonia, phosphorus, and oxygen at temperatures higher than those used and taught by Christian with an unexpected result in solid products therefrom of both higher phosphorus and total plant nutrient (N + $P_2O_5$ equivalent) contents and (2) a method of hydrolyzing the products to yield materials eminently suitable as fertilizers. Lewis maintains the temperature in the first stage of the reactor between 950° to 1065°F. On the other hand, Christian carries out his first-stage of the reaction at much lower temperatures, i.e., at about 300°F and preferably between about 195° to 285°F. In the second-stage reactor of Lewis' process the reaction temperature is maintained above about 1200°F, preferably between 1400° and about 1600°F, and still most preferably between about 1400° and 1500°F. On the other hand, Christian teaches passing the reaction gases through a second-stage reaction zone maintained at much lower temperatures, i.e., above 570°F and in his preferred embodiment between about 800° and 1100°F.

The solid reaction products obtained by the process of Lewis contain considerably more phosphorus than those reported by Christian, i.e., about 34 percent to about 41 percent as compared with 30 percent to about 32 percent. Lewis' products contain 12 to 20 percent nitrogen. The water solubility of the solid products obtained by Lewis in his two-stage process is predetermined and is in the range from about 20 to 95 percent. The product may be further solubilized by hydrolyzing it with aqueous medium (water, water vapor, steam, and mixtures thereof) at 212° to 400°F and 0–240 psig for about 5 to 60 minutes.

The molecular structure of the products obtained by Lewis in his two-stage process is not known. Petrographic, electron microscope, and X-ray analysis indicate that some of the products are amorphous gels and others are mixtures of gels together with minor phases of monoammonium orthophosphate and unidentifiable crystal phases. Chromatographic analyses indicate that the phosphorus in his products is present in a highly condensed form; the soluble phosphates (0.5 N NaOH) are distributed as 7 to 40 percent orthophosphate, 25 to 60 percent pyrophosphate to nonapolyphosphates, and 20 to 55 percent as polyphosphates containing more than 9 phosphorus atoms in the molecule. Infrared analysis suggests that the products are polyphosphate polymers containing some PN and PNO linkages as well as P—O—P linkages.

Christian, in another patent (U.S. Pat. No. 2,884,318), teaches eliminating the phosphorus oxidation step prior to ammoniating the combustion gases. In that sense, his work, like that of the present invention, involves a simultaneous reaction of vapor phase mixtures of ammonia and oxygen with phosphorus in a single-stage reactor. In Christian's process elemental P is contacted with gas mixtures of oxygen, ammonia, and nitrogen at reaction temperatures below about 300°F. The product is cooled and collected in a bag filter or electrostatic precipitator. He teaches that his product is substantially nonhygroscopic and substantially insoluble in water, and a typical ultimate analysis thereof is a grade of 19–69–0 (30.1 percent P). In neither of the two patents of Christian is there a disclosure of tests or the like to show the effectiveness of his materials as fertilizers. He teaches only that the material may be applied conventionally to plants in the form of an aqueous dispersion or suspension.

Our invention is directed to an improved method for producing nitrogen-phosphorus compositions. In essence, the novelty of our invention consists of a simultaneous exothermic reaction of elemental phosphorus with a low proportion of ammonia and an excess of oxygen in a single-stage reactor at temperatures between about 500° to 1300°F to yield highly concentrated water-soluble materials eminently suitable as fertilizers.

The molecular structure of our new solid products is not now known. Petrographic analysis indicates that the products are amorphous materials that contain traces of crystalline species; the refractive index of the products is in the range of long-chain ammonium polyphosphates. The infrared spectra suggest that the water-soluble portion of the products are long-chain ammonium polyphosphates and that the small proportions of water-insoluble material are similar to $(PNO)_n$ type compounds. Chromatographic analyses of the products indicate that most of the soluble phosphates (0.5 N NaOH) are polyphosphates. The soluble phosphates are distributed as 3 to 6 percent orthophosphate, 2 to 6 percent pyrophosphate, 1 to 4 percent as tripolyphosphate, and 84 to 94 percent as polyphosphates containing more than three phosphorus atoms in the molecule.

Our new single-stage process for producing nitrogen and phosphorus compositions is a significant improvement over both the teachings of Lewis and the teachings of Christian supra whereby the simultaneous reaction of ammonia, phosphorus, and oxygen is carried out in a two-stage process. Our single-stage process simplifies reactor construction and operation, thus reducing cost in a process scale-up. Since our single-stage process requires only one instead of two heating zones, the need for heating between stages is eliminated and fewer control devices and less equipment are required.

Our new single-stage process wherefrom is eliminated the separate phosphorus-oxidation step prior to ammoniation is a substantial improvement on the teachings of the single-stage process of Christian as follows:

1. In our process, the temperature of the single-stage reactor is maintained at greater than 400°F and less than 1350°F, preferably between about 500° and about 1300°F and still more preferably at 600° to 1150°F. On the other hand, Christian teaches passing the reaction gases through the reaction zone at much lower temperatures, i.e., below about 300° and preferably between 77° and about 250°F. Our process would require less cooling capacity than Christian's process.

2. In our process, we control and proportion the introduction of said vapors of ammonia, oxygen, and elemental phosphorus into the reaction zone (single-stage reactor) to maintain therein (a) an excess of oxygen in the range greater than 120 percent and up to about 800 percent limit (for reasons of economy) and preferably about 375 percent to about 600 percent (all percents by weight) of that required to yield an $O_2:P_4$ mole ratio of 5, and (b) a quantity of ammonia greater than about 50 percent and less than about 80 percent and preferably in the range from about 60 to about 70 percent of that required to yield an N:P atomic ratio of 2. The reaction mixture of vapors of ammonia, oxygen, and phosphorus in our process consists of between about 6 percent and about 19 percent by volume of oxygen (equivalent to between about 29 percent and about 90 percent by volume of dry air), between about 0.9 percent and about 4.8 percent by volume of anhydrous ammonia, between about 0.2 and about 1 percent by volume of phosphorus, and the remainder as a nonreactive or inert gas at reaction temperature, such as nitrogen. On the other hand, Christian teaches introducing phosphorus into the reaction zone in gas mixtures that contain less oxygen (0.1 to 5 volume percent vs. about 6 to about 19 volume percent) and more anhydrous ammonia (5 to 50 volume percent vs. about 0.9 to about 4.8 volume percent); the remainder of the gas mixture is nonreactive at reaction temperature. Since the ammonia concentration is lower in our process, the requirements for recovery of excess ammonia would be less. The solid reaction products obtained by our single-stage process contain more phosphorus than those reported by Christian, i.e., about 31 to 33 percent as compared with about 30 percent.

3. In our process, new solid products of extremely high water solubility (about 90 to 100 percent of both N and P values at 77°F) have been obtained. Greenhouse tests, to be discussed later, show that our highly water-soluble solid products are eminently suitable as fertilizers. Christian teaches that his solid product is substantially insoluble in water and has low or limited solubility. He teaches only that the material is stable enough to be applied to plants in the form of an aqueous dispersion or suspension. Tests of the use of his product as a fertilizer appear to be unreported.

4. The solid products produced by our process are white, dry materials with good storage properties. They contain from about 14 to 16 percent nitrogen and 31–33 percent phosphorus (71 to 76 percent $P_2O_5$ equivalent) and are highly concentrated in total plant nutrients (N + $P_2O_5$ equivalent up to 91 percent). In addition, the N:$P_2O_5$ weight ratios in the products from practicing our invention ranged from about 0.19 to 0.23. On the other hand, Christian teaches that the solid product from his invention contained about 19 percent by weight of nitrogen and about 30 percent by weight of phosphorus and corresponds to about 19-6-9-0 grade and an N:$P_2O_5$ weight ratio of 0.28, which is not in the range of the new solid products obtained in our invention. In Christian's teaching, there is no disclosure of retention time of the reaction gases in the reaction zone. In our new process, the residence of vapors of ammonia, oxygen (air) and elemental phosphorus is maintained in the single-stage reaction zone in the range of less than 4 seconds and greater than 0.1 second, preferably from about 0.5 to about 3.5 seconds, and still more preferably for about 1 second.

It is therefore an object of the present invention to produce a new composition of matter by the simultaneous vapor phase reaction of ammonia, phosphorus, and oxygen (air) in a single-stage reactor yield white, dry, free-flowing solid products which are highly water soluble (about 90 percent of both N and P at 77°F and up to 100 percent water solubility of the N and P at 77°F) wherein the phosphorus-oxidation step prior to ammoniation of the combustion gases is completely eliminated.

Another object of our present invention is to produce a new composition of matter by simultaneously reacting vapors of ammonia, phosphorus, and oxygen (air) in a single-stage reactor, that is eminently suitable as fertilizer material for direct application to the soil wherein the phosphorus-oxidation step prior to ammoniation of the combustion gases is completely eliminated.

Another object of the present invention is to produce a new composition of matter by the vapor-phase reaction of ammonia, phosphorus, and oxygen (air) in a single-stage reactor to yield dry, free flowing solid products which are highly concentrated in phosphorus (up to 33.2 percent) and in total plant nutrients (N + $P_2O_5$ equivalent up to 91 percent) wherein the phosphorus-oxidation step prior to ammoniation of the combustion gases is completely eliminated.

A further object of the present invention is to yield our desired results described above wherein the phosphorus-oxidation step prior to ammoniation is completely eliminated and wherein is incorporated the simultaneous reaction of ammonia, phosphorus, and oxygen in a single-stage reactor at substantially higher temperatures and with higher proportions of $O_2$:$P_4$ and lower proportions of $NH_3$:$P_4$ in the reaction gas mixtures than taught by the prior art for a single-stage process.

Still further and more general objects and advantages of the present invention will appear from the more detailed description set forth below, it being understood, however, that this more detailed description is given by way of illustration and explanation only and not by way of limitation since various changes therein may be made by those skilled in the art without departing from the spirit and scope of the present invention.

Our invention, together with further objects and advantages thereof, will be better understood from a consideration of the following description taken in connection with the accompanying drawings in which.

Figure 1:
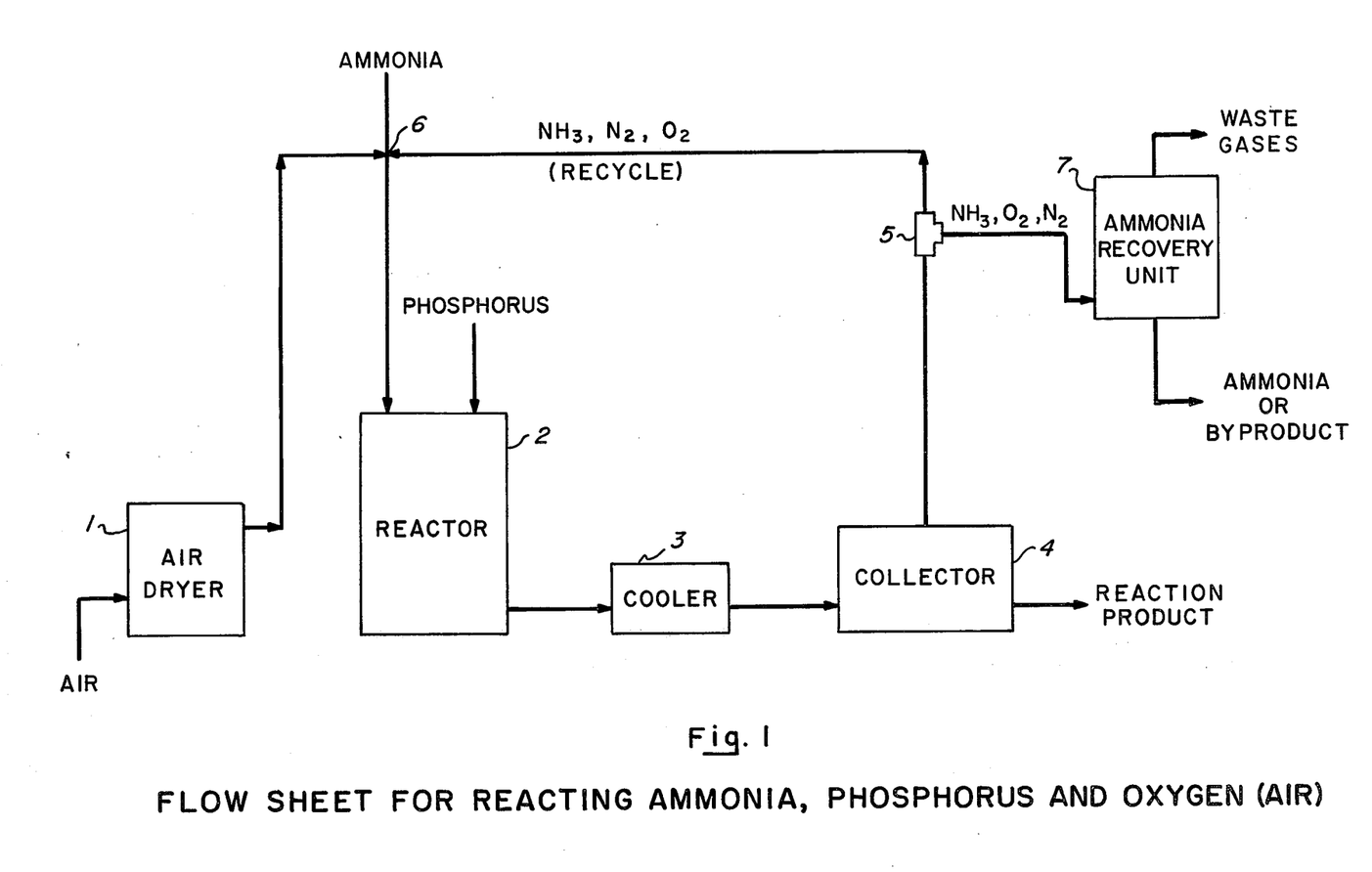
FIG. 1 is a flowsheet illustrating the principles utilized in carrying out our invention.

Referring now more specifically to FIG. 1, air is passed through air dryer 1 to reduce the moisture content thereof in that the presence of water vapor reduces the grade of the $P_4$—$NH_3$—$O_2$ reaction products. The dried air together with ammonia and phosphorus, all being in the vapor phase, are introduced into reactor tube 2. The reaction is exothermic and requires little or no external heat. Depending on the production rate, cooling of reactor 2, although not shown, may be necessary. Upon leaving reactor 2, the gases pass through cooler 3 and into collector 4 where they are removed in the form of dry, white powders. Effluent leaving collector 4 passes to point 5 where the effluent is split. The major part of the effluent is recycled to point 6. The remaining portion of the effluent is bled off to maintain a constant $N_2$:$P_4$ ratio in the feed. This portion of the effluent passes to ammonia recovery unit 7. In ammonia recovery unit 7, the ammonia may be recovered in an acid or water scrubber or by any other suitable means.

Figure 2:
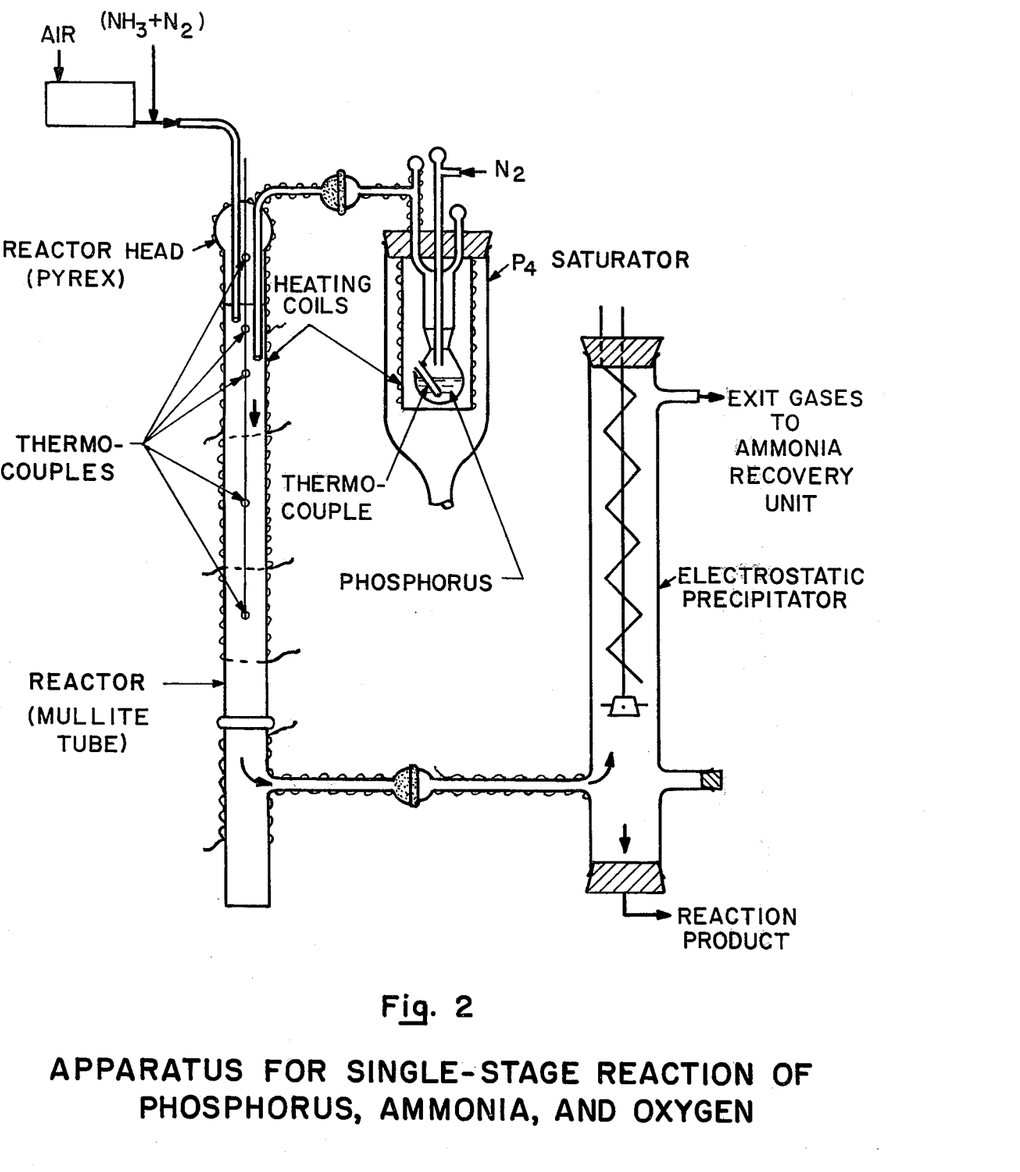
FIG. 2 is a diagram of the equipment we used on small-scale tests of our process for producing the solid products comprising our new composition of matter.

Referring now more specifically to FIG. 2, there is shown a diagram of the equipment we used on tests of the scale smaller than that of a commercial plant and of a size generally referred to as bench-scale. As may be seen, the phosphorus vapor was fed by means of a saturator to the reactor maintained at a temperature in the range of 400° to 1350°F. Simultaneously, ammonia, oxygen as dried air, and nitrogen, if desired, were metered to the reactor. The gases leaving the reactor were cooled and collected in an electrostatic precipitator as dry, white powders. Effluent from the precipitator passed through the ammonia recovery unit. The retention time of gases in the reactor, maintained in the temperature range of 400° to 1350°F, ranged from 0.1 to 3.5 seconds. The desired retention time was maintained by varying either the volume of the feed gases or the proportion of the reactor tube that was heated at test temperature. The oxygen (dried air) input ranged from 120 percent up to 800 percent of that required for mole ratio $O_2$:$P_4$ = 5. Ammonia input ranged from 35 to 200 percent of that required for atomic ratio of N:P = 2. In some tests, $N_2$ was added to the input gases as a diluent. The total added $N_2$, including carrier gas for phosphorus, was 65 weight percent of the total charge of feed. In other tests, $N_2$ was omitted as a diluent and used only as carrier gas for phosphorus. Air used in the process was dried to a dew point of −80°F (0.000005 lb. water/lb. of dry air) by passing it through an anhydrous calcium sulfate absorption system. The production rate, calculated on basis of recovery of all input phosphorus as product (dry, white powders) containing 32 percent P, ranged from about 15 to 70 grams per hour to 120–235 grams per hour for tests in reactor tubes of 1.0- to 3.5-inch-inside diameter, respectively.

Prior investigators of the art of reacting phosphorus or phosphorus pentoxide with ammonia or mixtures of ammonia and oxygen to prepare nitrogen-phosphorus compositions of matter had to contend with the formation of some undesirable glassy materials, the presence of which reduced the yield of reaction product. The glass was found to be a viscous, hygroscopic material that either adhered to the inner wall of the reaction vessel and/or collected with the product in receiving vessels such as bag filters or electrostatic precipitators.

In preliminary tests of our single-stage process, we, like those in the prior art referred to above, found that substantial proportions of the feed deposited on the wall of the reactor as viscous, hygroscopic glass. The material was of about 7-85-0 grade. Tests made in a 2.5-inch-inside diameter reactor (mullite tube) indicated that glass formation on the wall of the reactor might be reduced somewhat by increasing the velocity of the gases through the reactor (1.7 vs. 0.5 ft./sec). This effect of velocity on glass formation was confirmed in tests with a smaller diameter (1.0 in.) reactor; glass formation generally decreased with increase in linear velocity (1.7-6.7 ft./sec.) and also with decrease in retention time (2.0-0.5 sec.). However, the proportions of glass were higher in the tests with the smaller diameter reactor than with the larger diameter reactor. These results indicated that reductions in formation of glass was favored by larger reactor diameter (lower surface:volume ratio).

Figure 3:
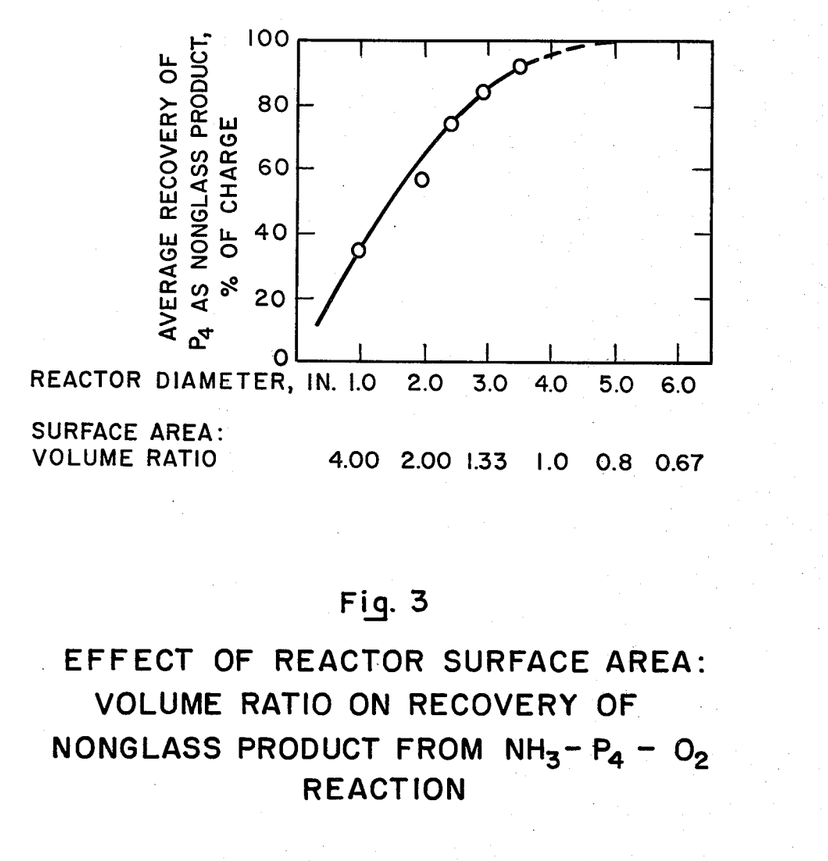
FIG. 3 is a curve showing recovery of phosphorus as nonglass product (dry, white solid materials) versus reactor surface area volume ratio for tests in the various diameter single-stage reactors.

Referring now more specifically to FIG. 3, there is shown a curve of recovery of phosphorus as nonglass product (dry, white solids) versus surface area:volume ratio for tests that we made in various diameter single-stage reactors. This curve shows the very significant increases in product recovery that were effected by increasing reactor diameter (decreasing surface area:volume ratio). A 3.5-inch-inside diameter reactor tube was the largest that we were able to use for conducting our laboratory tests of the scale smaller than that of a pilot plant or commercial plant and of a size generally referred to as bench scale. Projection of the curve (broken line) indicates that phosphorus recovery as product would approximate 100 percent if the reaction were carried out in a cylindrical reactor tube of about 5-inch-inside diameter (surface area:volume ratio, 0.8). Recovery equipment of pilot-plant scale would be required however.

We obtained the best recovery of ammonia and phosphorus as useful product, 80 and 95 percent, respectively, in our work with the 3.5-inch diameter reactor (surface area:volume ratio, 1.14). The product was 15-75-0 grade, 95 percent water soluble, and had good physical properties. We have found that the grade of the products and physical characteristics from tests made in the 3.5-inch-diameter tube were about the same as those obtained under similar conditions in tests with smaller diameter reactors.

In order that those skilled in the art may better understand how the present invention can be practiced and more fully and definitely understood, the following examples of processes that we have used in the preparation for the production of nitrogen-phosphorus compounds prepared according to our invention are given by way of illustration and not by way of limitation.

EXAMPLE I

The tubular single-stage reactor (FIG. 2) consisted of an electrically heated tube of McDanel mullite (3.5-in I.D. by 24-in long). Phosphorus vapor (about 49.5 g/hr) with nitrogen carrier gas (1.3 g $N_2$/g $P_4$) was fed from a calibrated saturator (about 374°F) through a heated glass line to the reactor maintained at 1000°F.

Simultaneously, a gas mixture consisting of ammonia (1.1 volume percent), dry air (34.2 volume percent equivalent to 7.2 volume percent oxygen) and nitrogen ($N_2$) as a diluent (64.7 volume percent) were metered to the reactor by means of glass laboratory flowmeters. The input gas mixtures ($NH_3$ + air + $N_2$ and $P_4$ + $N_2$) were heated to 500°-600°F and brought together as they entered the reactor. The total added $N_2$ including carrier for the phosphorus was 65 weight percent of the total charge of feed. The feed rate of ammonia, dry air, and nitrogen as a diluent were 33, 1662, and 3038 grams per hour, respectively. Retention time of the gases in the reactor was 1.0 second at operating conditions. Linear velocity of the input gases was 1.7 feet per second. The effective reactor voluem was 3154 cubic centimeters. The total volume of gases charged through the system was 63,715 cubic centimeters per minute (S.T.P.).

Oxygen (dry air) input was 600 percent of that required for a mole ratio $O_2:P_4 = 5$, and ammonia 60 percent of that required for atomic ratio N:P = 2.

The gases leaving the reactor passed through a post reaction zone (1 in. I.D. by about 10 in. long) where they were cooled to about 300°F and then collected in an electrostatic precipitator as dry, white powders. Unreacted ammonia was caught in a sulfuric acid scrubber.

The precipitator product was 15-75-0 grade and contained 90 percent total plant nutrient (N + $P_2O_5$ equivalent); 95 percent of both nitrogen and phosphorus were water soluble at 77°F. The N:$P_2O_5$ weight ratio in the product was 0.20.

The recovery of ammonia and phosphorus as nonglass product (dry, white powders) in the precipitator was about 80 and 95 percent, respectively. If the $N_2$ added (65 weight percent of the feed) was obtained by recycling effluent, ammonia utilization would be higher because some of the ammonia would be recycled also. Input ammonia and phosphorus accounted for as glass in the reactor was 2 and 5 percent, respectively. The amount of ammonia as glass in the reactor was calculated by converting $P_4$ recovered as glass in the reactor to grams of ammonia as glassy material of grade 7-8-5-0. About 13 percent of the input ammonia was recovered in the acid scrubber and less than 5 percent was lost by cracking or otherwise was unaccounted for.

The results of other tests of the process with the single-stage reactor are shown in tables I through VI, infra.

EXAMPLE II

Increasing the reactor diameter over the range of 1.0 to 3.5 inches decreased surface area:volume ratio from 4.00 to 1.14. This had little, if any, effect on the products collected in the precipitators. The products were about the same grade (14-74-0 vs. 15-75-0) and had about the same water solubilities (92 vs. 95 percent of both N and $P_2O_5$ at 77°F). All products had good physical properties (dry, white powders).

EXAMPLE III

Increasing reactor diameter over the range of 1.0 to 3.5 inches caused progressive increases in recovery of ammonia and phosphorus as non-glass product (dry, white powders). Recovery of ammonia and phosphorus as product increased from 27 to 65 and from 37 to 92 percent, respectively. A recovery of input $P_4$ approximating 100 percent could be obtained if the reaction were carried out in a reactor tube of about 5-inch inside diameter (FIG. 3, supra), i.e., a reactor surface area:volume ratio of 0.8. For convenience, our tests were carried out in tubular-type reactors since they were easier to assemble and operate on our bench scale setup. However, it should be appreciated that perhaps other shapes of reactor could conceivably prove to be as effective and might, on scaleup of our process, be incorporated in a full-size production plant. In considering this we have reported the characteristics of our product not only in terms of diameter but also in terms of reactor surface area:volume ratio so that our readers can make use of our data in scaling up with different shape reactors if they find it desirable.

ratio $O_2:P_4 = 5$. Total added $N_2$ including carrier for phosphorus was 65 weight percent of total charge. Linear velocity was 1.7 feet per second. Retention time at operating conditions was 1.0 second.

EXAMPLE IV

With 200 percent theoretical ammonia, the product was 17–73–0 grade and 58 percent water soluble. Decreasing theoretical ammonia from 200 percent to 80 percent caused only a slight increase in grade (16–75–0 vs. 17–73–0), but increased water solubility of the product from 58 to 70 percent. Decreasing theoretical ammonia from 80 to 70 percent increased water solubility of the product from 70 to 92 percent. Product grade was about the same (16–75–0 vs. 15–75–0). Decreasing input ammonia from 70 percent to 60 percent caused a further increase in water solubility of the product (95 vs. 92 percent). Products obtained with ammonia input from 200 percent to 60 percent of theoretical had good physical properties (dry, white powders). With a further decrease in input ammonia to 50 percent (test 188), the product was 13–77–0 grade, 98 percent water soluble, but had poor physical properties (hygroscopic) due to its low $N:P_2O_5$ weight ratio (0.169). A further decrease in theoretical ammonia to 35 percent gave a material that was very wet and unsuitable for chemical analysis. The data show that the process must operate with proportions of input ammonia between about 60 and 70 percent of theoretical to obtain the desired water solubility (about 90 percent or greater of both N and $P_2O_5$ contents of the products at 77°F).

Table I

| | Reaction of Ammonia, Phosphorus, and Oxygen (Air) | | | |
|---|---|---|---|---|
| Test No.[a] | 167A | 177 | 181 | 183 |
| Reactor tube I.D., in. | 1.00 | 2.00 | 3.00 | 3.50 |
| Surface area:volume ratio | 4.00 | 2.00 | 1.33 | 1.14 |
| Materials charged, g/hr (S.T.P.) | | | | |
| $NH_3$ | 3.10 | 1.40 | 27.90 | 38.30 |
| $P_4$ | 4.00 | 15.00 | 36.70 | 48.90 |
| Product (nonglass)[b] | | | | |
| Composition | | | | |
| Grade | 15-75-0 | 15-74-0 | 14-74-0 | 15-75-0 |
| W.S. N or $P_2O_5$ at 77°F, % of total | 95 | 93 | 94 | 92 |
| $N:P_2O_5$ weight ratio | 0.200 | 0.203 | 0.189 | 0.200 |
| Recovery, % of charge | | | | |
| $NH_3$ | 27 | 43 | 58 | 65 |
| $P_4$ | 37 | 58 | 83 | 92 |

[a]Reactor temperature, 1000°F; ammonia input, 70% of amount required for atomic ratio N:P of 2; oxygen (dry air) input, 600% of amount required for mole ratio $O_2:P_4 = 5$. Total added $N_2$ including carrier for phosphorus, 65 weight percent of total charge. Linear velocity of input gases, 1.7 feet per second. Retention time, 1.0 second.
[b]Collected in electrostatic precipitators as dry, white powders.

These data show (1) that reactor surface area:volume ratio had little effect, if any, on composition and physical properties of the products and (2) the very significant increases in recovery of ammonia and phosphorus as nonglass product that were affected by increasing reactor diameter (decreasing surface area:volume ratio). The temperature of the single-stage reactor was 1000°F. The ammonia input was 70 percent of amount required for atomic ratio N:P of 2. Oxygen (dry air) was 600 percent of amount required for mole Table II

| | | Reaction of Ammonia, Phosphorus, and Oxygen (Air) | | | |
|---|---|---|---|---|---|
| | | Product | | | |
| Test No.[a] | % of theoretical $NH_3$[b] | Grade | W.S. N or $P_2O_5$ at 77°F, % of total | $N:P_2O_5$ weight ratio | Condition on removal from precipitators |
| 160-A | 200 | 17-73-0 | 58 | 0.233 | Dry, white powder |
| 161-A | 80 | 16-75-0 | 70 | 0.213 | Dry, white powder |
| 183 | 70 | 15-75-0 | 92 | 0.200 | Dry, white powder |
| 184 | 60 | 15-75-0 | 95 | 0.200 | Dry, white powder |
| 188 | 50 | 13-77-0 | 98 | 0.169 | Hygroscopic |
| 195 | 35 | — | — | — | Very wet |

[a]Reactor temperature, 1000°F; oxygen (dry air) input, 600% of amount required for mole ratio $O_2:P_4 = 5$.

Table II-continued

Reaction of Ammonia, Phosphorus, and Oxygen (Air)

| Test No.[a] | % of theoretical $NH_3$[b] | Grade | W.S. N or $P_2O_5$ at 77°F, % of total | Product $N:P_2O_5$ weight ratio | Condition on removal from precipitators |
|---|---|---|---|---|---|

Total added $N_2$ including carrier for phosphorus, 65 weight percent of total charge. Retention time, 1.0 second.
[b]Percent theoretical ammonia based on amount required for atomic ratio N:P of 2.

These data in table II show the effect of varying the proportions of ammonia on the grade, water solubility, and physical properties of the products. The tests were made with the single-stage reactor maintained at 1000°F. Ammonia input was varied from 200 to 35 percent of the amount required for atomic ratio N:P of 2. Oxygen (dry air) input was 600 percent of amount required for mole ratio $O_2:P_4 = 5$. Total added $N_2$ including carrier for phorphorus was 65 weight percent of total charge. Retention time was 1.0 second.

EXAMPLE V

With an oxygen (dry air) input of 800 percent of amount required for mole ratio $O_2:P_4 = 5$ and 1.0 second retention time, the product was 15–75–0 grade and 96 percent water soluble. Decreasing theoretical oxygen (dry air) from 800 percent to 600 percent and then from 600 percent to 375 percent resulted in products of about equal grade (15–75–0 vs. 14–74–0) and about equal water solubility (96 vs. 94 percent). All products were dry, white powders. Decreasing input oxygen (dry air) from 375 percent to 120 percent of theoretical changed the product from a dry, white powder to a sticky material which ignited on exposure to the atmosphere. With 120 percent input of oxygen (dry air), increasing the retention time from 1.0 to 3.5 seconds did not improve the physical condition of the material.

EXAMPLE VI

With 1000°F reactor temperature, 70 percent theoretical input ammonia, 600 percent theoretical input oxygen (dry air) and $N_2$ as diluent (65 weight percent of total charge), the product was 15–75–0 grade and 92 percent water soluble. Omitting $N_2$ as diluent decreased the grade from 15–75–0 to 14–74–0 and increased the water solubility of the product from 92 to 98 percent. Both products were dry, white powders.

EXAMPLE VII

With 1000°F reactor temperature, 60 percent theoretical input ammonia, 800 percent theoretical input oxygen (dry air) and $N_2$ as diluent (65 weight percent of total charge), the product was 15–75–0 grade and 96 percent water soluble. Omitting $N_2$ as diluent decreased the grade from 15–75–0 to 14–72–0 and increased water solubility of the product from 96 to 100 percent. Both products were dry, white powders.

EXAMPLE VIII

With 1000°F reactor temperature, 60 percent theoretical input ammonia, 375 percent theoretical input oxygen (dry air) and $N_2$ as a diluent (65 weight percent of total charge), the product was 14–74–0 grade and 94 percent water soluble. Omitting $N_2$ as diluent, decreased the grade from 14–74–0 to 14–71–0 and increased water solubility of the product from 94 to 100 percent. Both products were dry, white powders.

Table III

Reaction of Ammonia, Phosphorus, and Oxygen (Air)

| Test No.[a] | % theoretical 2 2[b] | Reactor[c] retention time, sec. | Grade | N + $P_2O_5$ equivalent | Product[d] W.S. N or $P_2O_5$ at 77°F % of total | $N:P_2O_5$ weight ratio | Condition on removal from precipitators |
|---|---|---|---|---|---|---|---|
| 185 | 800 | 1.0 | 15-75-0 | 90 | 96 | 0.200 | Dry, white powder |
| 184 | 600 | 1.0 | 15-75-0 | 90 | 95 | 0.200 | Dry, white powder |
| 186 | 375 | 1.0 | 14-74-0 | 88 | 94 | 0.189 | Dry, white powder |
| 192 | 120 | 1.0 | — | — | — | — | Sticky and ignited |
| 194A | 120 | 3.5 | — | — | — | — | Sticky and ignited |

[a]Ammonia input, 60 percent of amount required for atomic ratio N:P of 2. Total added $N_2$ including carrier gas for phosphorus, 65 weight percent of total charge.
[b]Percent theoretical oxygen (dry air) based on amount required for mole ratio $O_2:P_4 = 5$.
[c]Temperature, 1000°F.
[d]Collected in electrostatic precipitators.

These data (Table III) show the effect of varying the proportion of oxygen (dry air) on grade, water solubility, and physical properties of the products. The temperature of the single-stage reactor was maintained at 1000°F. The ammonia input was 60 percent of amount required for atomic ratio N:P of 2. Total added $N_2$ including carrier for phosphorus was 65 weight percent of total charge. Retention time at operating conditions was 1.0 second except in test 194A, where it was increased to 3.5 seconds.

EXAMPLE IX

With 800°F reactor temperature, 60 percent theoretical input ammonia, 800 percent theoretical input oxygen (dry air) and $N_2$ as a diluent (65 weight percent of total charge), the product was 15–76–0 grade and 92 percent water soluble. Omitting $N_2$ as diluent decreased the grade from 15–76–0 to 15–73–0 and increased water solubility of the product from 92 to 100 percent. Both products were dry, white powders.

EXAMPLE X

With 600°F reactor temperature, 70 percent theoretical input ammonia, 600 percent theoretical input oxygen (dry air) and $N_2$ as a diluent (65 weight percent of total charge), the product was 15–74–0 and 92 percent water soluble. Omitting $N_2$ as diluent, decreased the grade from 15–74–0 to 14–70–0 and increased water solubility of the product from 92 to 100 percent. Both products were dry, white powders.

of 400°F, increasing retention time from 1.0 to 3.5 seconds did not improve the physical condition of the material.

Table V

Reaction of Ammonia, Phosphorus, and Oxygen (Air)

| Test No.[a] | Reactor temperature, °F | Reactor retention time, sec. | Product[b] | | | | |
|---|---|---|---|---|---|---|---|
| | | | Grade | $N + P_2O_5$ equivalent | W.S. N or $P_2O_5$ at 77°F, % of total | $N:P_2O_5$ weight ratio | Condition on removal from precipitators |
| 212 | 1350 | 1.0 | — | — | — | — | Wet and sticky |
| 206 | 1150 | 1.0 | 15-74-0 | 89 | 92 | 0.203 | Dry, white powder |
| 186 | 1000 | 1.0 | 14-74-0 | 88 | 94 | 0.189 | Dry, white powder |
| 191 | 800 | 1.0 | 15-76-0 | 91 | 93 | 0.197 | Dry, white powder |
| 190 | 600 | 1.0 | 15-72-0 | 87 | 95 | 0.208 | Dry, white powder |
| 213 | 400 | 1.0 | — | — | — | — | Wet |
| 214 | 400 | 3.5 | — | — | — | — | Wet |

[a]Ammonia input, 60 percent of amount required for atomic ratio N:P of 2. Oxygen (dry air) input, 375 percent of amount required for mole ratio $O_2:P_4 = 5$. Total added $N_2$ including carrier gas for phosphorus, 65 weight percent of total charge.
[b]Collected in electrostatic precipitators.

These data (Table V) show the effect of varying the temperature of the single-stage reactor on grade, water Table IV Reaction of Ammonia, Phosphorus, and Oxygen (Air)

| Test No.[a] | % theoretical $NH_3$[b] | % theoretical $O_2$[c] | $P_4$ charged, g/hr (S.T.P.) | $N_2$ added as diluent, wt.% of total charge | Reactor temp., °F | Product[d] | | | |
|---|---|---|---|---|---|---|---|---|---|
| | | | | | | Grade | $N + P_2O_5$ equivalent | W.S. N or $P_2O_5$ at 77°F % of total | $N:P_2O_5$ weight ratio |
| 183 | 70 | 600 | 49.8 | 65[e] | 1000 | 15-75-0 | 90 | 92 | 0.200 |
| 204 | 70 | 600 | 33.4 | 0[f] | 1000 | 14-74-0 | 88 | 98 | 0.189 |
| 185 | 60 | 800 | 37.7 | 65[e] | 1000 | 15-75-0 | 90 | 96 | 0.200 |
| 201 | 60 | 800 | 25.4 | 0[f] | 1000 | 14-72-0 | 86 | 100 | 0.194 |
| 186 | 60 | 375 | 77.8 | 65[e] | 1000 | 14-74-0 | 88 | 94 | 0.189 |
| 202 | 60 | 375 | 52.5 | 0[f] | 1000 | 14-71-0 | 85 | 100 | 0.197 |
| 187 | 60 | 800 | 43.7 | 65[e] | 800 | 15-76-0 | 91 | 92 | 0.197 |
| 203 | 60 | 800 | 29.7 | 0[f] | 800 | 15-73-0 | 88 | 100 | 0.205 |
| 175 | 70 | 600 | 20.6 | 65[e] | 600 | 15-74-0 | 89 | 92 | 0.203 |
| 205 | 70 | 600 | 46.7 | 0[f] | 600 | 14-70-0 | 84 | 100 | 0.200 |

[a]Reactor retention time, 1.0 second. $N_2$ as carrier for $P_4$, 0.8-3.2 g/g $P_4$.
[b]Percent theoretical ammonia based on amount required for atomic ratio N:P of 2.
[c]Percent theoretical oxygen (dry air) based on amount required for mole ratio $O_2:P_4 = 5$.
[d]Collected in electrostatic precipitators (dry, white powders).
[e]Includes $N_2$ as carrier for $P_4$.
[f]Does not include $N_2$ as carrier for $P_4$.

In our new single-stage process, we found that our desired products could be obtained with $N_2$ added as a diluent to the feed gases or, if desired, with $N_2$ omitted. These data (Table IV) show the effect of the $N_2$ on grade, water solubility, and physical properties of the products. The tests were made with 1.0 second retention time at operating conditions and under various process conditions.

EXAMPLE XI

With reactor temperature of 1350°F and 1.0 second retention time, a material was obtained in the precipitator that was wet and sticky. Decreasing reactor temperature to 1150°F (test 206) gave a product of 15–74–0 grade, of 92 percent water solubility, and with good physical properties (dry, white powder). Further decreases in reactor temperature from 1150° to 1000°F, from 1000° to 800°F, and from 800° to 600°F resulted in products of grade 14–74–0, 15–76–0, and 15–72–0, respectively; water solubilities of the products were about the same (95 percent). These products were dry, white powders. Decreasing reactor temperature from 600° to 400°F changed the product from a dry, white powder to a wet material. With a reactor temperature solubility and physical properties of the products. Ammonia input was 60 percent of amount required for atomic ratio N:P of 2. Oxygen (dry air) input was 375 percent of amount required for mole ratio $O_2:P_4 = 5$. Total added $N_2$ including carrier for phosphorus was 65 weight percent of total charge. Retention time at operating conditions was 1.0 second except in test 214, where it was increased to 3.5 seconds.

EXAMPLE XII

With reactor retention time of 3.5 seconds at operating conditions, the product was 14–74–0 grade and 95 percent water soluble. Decreasing retention time from 3.5 to 1.0 second did not cause a change in grade and had little effect on the water solubility of the product (95 vs. 94 percent). Decreasing retention time to 0.5 second (test 169A) gave a product of lower grade (15–69–0 vs. 14–74–0), but did not affect the water solubility significantly. All the products in these tests had good physical properties (dry, white powders). Decreasing retention time to 0.1 second (test 215) caused formation of material which ignited on exposure to the atmosphere.

Table VI

Reaction of Ammonia, Phosphorus, and Oxygen (Air)

| Test No.[a] | Reactor[b] retention time, sec | Grade | N + $P_2O_5$ equivalent | Product[c] W.S. N or $P_2O_5$ at 77°F, % of total | N:$P_2O_5$ weight ratio | Condition on removal from precipitators |
|---|---|---|---|---|---|---|
| 208 | 3.5 | 14-74-0 | 88 | 95 | 0.189 | Dry, white powder |
| 186 | 1.0 | 14-74-0 | 88 | 94 | .189 | Dry, white powder |
| 169A | 0.5 | 15-69-0 | 84 | 96 | .217 | Dry, white powder |
| 215 | 0.1 | — | — | — | — | Ignited |

[a]Ammonia input, 60 percent of amount required for atomic ratio N:P of 2. Oxygen (dry air) input, 375 percent of amount required for mole ratio $O_2$:$P_4$ = 5. Total added $N_2$ including carrier gas for phosphorus, 65 weight percent of total charge.
[b]Temperature, 1000°F.
[c]Collected in electrostatic precipitators.

These data (Table VI) show the effect of reactor retention time on grade, water solubility, and physical properties of the products. Reactor temperature was 1000°F. Ammonia input was 60 percent of amount required for atomic ratio N:P of 2. Oxygen (dry air) input was 375 percent of amount required for mole ratio $O_2$:$P_4$ = 5. Total added $N_2$ including carrier for phosphorus was 65 weight percent of total charge.

indicated that our product was a fully effective source of N and P.

After sifting and winnowing through the data presented above as well as other data available to us, we have determined that the operating limits as well as the preferred and the most preferred conditions and variables for carrying out our process are as summarized below:

| Reaction variables | Limits | Preferred | Most preferred |
|---|---|---|---|
| Ammonia input, % by weight of amount required for atomic ratio N:P of 2 | >50 and <80 | 60–70 | 60 |
| Oxygen (dry air) input, % by weight of amount required for mole ratio $O_2$:$P_4$ = 5 | >120 and up to 800 | 375–600 | 375 |
| Reactor temperature, °F | >400 and <1350 | 500–1300 | 600–1150 |
| Reactor retention time, sec. | >0.1 and <4 | 0.5–3.5 | 1 |

EXAMPLE XIII — GREENHOUSE TEST

Greenhouse tests of solid products (20–60 percent water soluble at 77°F) made by Lewis, Jr., from the reaction of $NH_3$-$P_4$-$O_2$ (air) in the two-stage reactor, U.S. Pat. No. 3,539,328 supra, indicated that the products were available to crops to the extent of their water solubilities. Solutions of his products obtained by hydrolysis with steam under pressure were effective as sources of nitrogen and phosphorus. Since our product made in the single-stage reactor was water soluble (about 90–100 percent), we believed it would be effective as fertilizer.

A sample of our product was submitted for a short-term greenhouse test. The product was made with the single-stage reactor operated at 1000°F. Ammonia input was 60 percent of amount required for atomic ratio N:P of 2. Oxygen (dry air) input was 375 percent of amount required for mole ratio $O_2$:$P_4$ = 5. Retention time at operating conditions was 1.0 second.

The analysis of the product is tabulated below.

Reactor surface area:volume ratio and $N_2$ as a diluent are not listed supra as reaction variables; they are, however, factors that we consider important for carrying out our process, particularly the reactor surface area:volume ratio. We have shown in Table I that recovery of ammonia and phosphorus as nonglass product (dry, white powders) increases significantly with increases in reactor diameter (lower surface:volume ratio). Projection of the curve (broken line, FIG. 3) indicates that the smallest reactor tube that could be used to carry out the reaction to obtain phosphorus recovery as product approximating 100 percent would be one of about 5-inch-inside diameter, and having a maximum surface area:volume ratio of about 0.8. The addition of nitrogen as a diluent to the feed gases is optional, but omitting it (Table IV) decreases the grade and increases the water solubility of the product.

While we have shown and described particular embodiments of our invention, modifications and variations thereof will occur to those skilled in the art. We wish it to be understood therefore that the appended claims are intended to cover such modifications and variations which are within the true scope and spirit of our invention.

| Sample No. | Particle size, mesh | Percent N | Percent P | W.S. of N or $P_2O_5$ at 77°F, % of total | Phosphate distribution, % Ortho | Pyro | Tripoly | >Tripoly |
|---|---|---|---|---|---|---|---|---|
| SSR-1 | −100 | 14.0 | 31.8 | 96 | 4.7 | 4.6 | 2.8 | 87.9 |

The availability of the product was tested as sources of N and P for corn in a conventional pot experiment in a 6-week growth period. Dry matter yields and uptakes

What we claim as new and desire to secure by letters patent of the United States is:

1. A single-stage vapor phase reaction process involving ammonia, oxygen, and elemental phosphorus for the production of unusually high analysis nitrogen-phosphorus compositions eminently suitable for use as fertilizer material comprising the steps of:
   1. simultaneously introducing vapors of ammonia, oxygen, and elemental phosphorus into a single-stage tubular reaction zone, said single-stage tubular reaction zone having a maximum surface area:volume ratio of about 0.8 in$^2$/in$^3$;
   2. maintaining in said single-stage tutular reaction zone a temperature in the range of greater than about 400° and less than about 1350°F:
   3. controlling and proportioning the introduction of said vapors of ammonia, oxygen, and elemental phosphorus into said single-stage tubular reaction zone to maintain therein (a) an excess of oxygen in the range from greater than about 120 percent up to about 800 percent (all percents by weight) of that required to yield a O$_2$:P$_4$ mole ratio of 5, and (b) a quantity of ammonia in the range from greater than about 50 and less than about 80 percent of that required to yield a N:P atomic ratio of 2;
   4. maintaining the residence time of said vapors of ammonia, oxygen, and elemental phosphorus in said single-stage tubular reaction zone in the range from greater than about 0.1 second to less than about 4 seconds; and
   5. withdrawing the resulting reaction product from said single-stage tubular reaction zone and collecting said product withdrawn from said reaction zone as a substantially nonhygroscopic, amorphous, white, particulate solid nitrogen-phosphorus product having a predetermined solubility in water and containing a N:P$_2$O$_5$ weight ratio in the range from about 0.19 to about 0.23.

2. The process of claim 1 wherein the temperature in said reaction zone is maintained in the range of about 500° to about 1300°F.

3. The process of claim 2 wherein the amount of excess oxygen in step (3) thereof ranges from about 375 to about 600 percent.

4. The process of claim 3 wherein the amount of ammonia in step (3) thereof ranges from about 60 to 70 percent.

5. The process of claim 4 wherein the residence time in step (4) thereof is in the range of about 0.5 to about 3.5 seconds.

6. The process of claim 5 wherein the temperature in the reaction zone is maintained in the range of about 600° to about 1150°F.

7. The process of claim 6 wherein the amount of excess oxygen in step (3) thereof is maintained at about 375 percent.

8. The process of claim 7 wherein the amount of ammonia in step (3) thereof is maintained at about 60 percent of that required.

9. The process of claim 8 wherein the reaction time in step (4) thereof is maintained at about 1 second.

* * * * *